(12) United States Patent
Gribetz et al.

(10) Patent No.: US 10,475,246 B1
(45) Date of Patent: Nov. 12, 2019

(54) SYSTEMS AND METHODS TO PROVIDE VIEWS OF VIRTUAL CONTENT IN AN INTERACTIVE SPACE

(71) Applicant: Meta View, Inc., San Mateo, CA (US)

(72) Inventors: Meron Gribetz, Belmont, CA (US); Yazan Kawar, San Mateo, CA (US); Rebecca Frank, Los Angeles, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 15/955,243

(22) Filed: Apr. 17, 2018

Related U.S. Application Data

(60) Provisional application No. 62/486,910, filed on Apr. 18, 2017.

(51) Int. Cl.
*G06T 19/00* (2011.01)
*G06F 3/0481* (2013.01)
*G06F 3/01* (2006.01)

(52) U.S. Cl.
CPC ............ *G06T 19/006* (2013.01); *G06F 3/017* (2013.01); *G06F 3/04815* (2013.01)

(58) Field of Classification Search
None
See application file for complete search history.

(56) References Cited

U.S. PATENT DOCUMENTS

| | | | | |
|---|---|---|---|---|
| 2005/0073531 | A1* | 4/2005 | Kuroki | G06T 19/006 345/633 |
| 2008/0071559 | A1* | 3/2008 | Arrasvuori | G06Q 30/06 705/26.1 |
| 2012/0218423 | A1* | 8/2012 | Smith | G06O 30/02 348/207.1 |
| 2014/0282162 | A1* | 9/2014 | Fein | G06F 3/0486 715/769 |
| 2015/0235088 | A1* | 8/2015 | Abovitz | G06F 16/7837 345/633 |
| 2015/0309705 | A1* | 10/2015 | Keeler | G06N 7/005 705/27.2 |
| 2016/0026253 | A1* | 1/2016 | Bradski | G02B 27/225 345/8 |
| 2016/0171597 | A1* | 6/2016 | Todeschini | G06Q 30/0623 705/26.61 |
| 2017/0235143 | A1 | 8/2017 | Chi | |
| 2018/0075655 | A1* | 3/2018 | Cabanier | G06F 3/012 |
| 2019/0012730 | A1* | 1/2019 | Keeler | G06N 7/005 |

* cited by examiner

*Primary Examiner* — Ryan M Gray

(57) ABSTRACT

A system configured to provide views of virtual content in an interactive space may comprise one or more of a light source, an optical element, one or more physical processor, non-transitory electronic storage, and/or other components. The optical element being configured to provide light emitted from the light source into one or more eyes of a user. The non-transitory electronic storage may be configured to store virtual content information defining virtual content. The virtual content may include one or more of a virtual gallery, one or more virtual objects, and/or other virtual content. The virtual gallery may comprise a set of supports. The virtual gallery may be configured to simulate removable engagement of individual virtual objects to individual supports.

22 Claims, 7 Drawing Sheets

SYSTEMS AND METHODS TO PROVIDE VIEWS OF VIRTUAL CONTENT IN AN INTERACTIVE SPACE

FIELD OF THE INVENTION

The system and methods described herein relate to providing views of virtual content in an interactive space.

BACKGROUND OF THE INVENTION

There are many types of vision systems that provide interactive spaces. Interactive spaces may include one or more of virtual reality (VR) environments, augmented reality (AR) environments, and/or other interactive spaces. In particular, wearable technology such as head mounted displays (HMD) are used.

SUMMARY

The systems and methods described herein facilitate providing views of virtual content (e.g., virtual objects in the form of three dimensional digital imagery) in an interactive space. The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. In some implementations, an augmented reality environment may represent physical objects in the physical world as virtual objects in the augmented environment. A virtual reality environment may refer to a space that includes the virtual environment. In the context of interactive spaces, the terms "space" and "environment" may be used interchangeably herein.

In some implementations, a system configured to provide views of virtual content in an interactive space may comprise one or more of one or more light sources, one or more optical elements, non-transitory electronic storage, one or more physical processors, and/or other components. A light source may be configured to emit light. An optical element may be configured to provide light emitted from the light source to an eye of a user to generate a perceived three-dimensional light field within a field of view of the user. The perception of the light field with the user's field of view may generate an interactive space, including an augmented reality space.

The non-transitory electronic storage may be configured to store virtual content information and/or other information. The virtual content information may define virtual content and/or other information. The virtual content may include a virtual gallery and/or other virtual objects. The virtual gallery may comprise a set of supports and/or other components. Individual ones of the supports may be positioned at discrete locations on the virtual gallery. The virtual gallery may be configured to simulate removable engagement of individual virtual objects to the individual supports. The user may perceive the virtual object as being supported by the supports similar to physical items may be perceived to be supported within shelves.

The one or more physical processors may be configured by machine-readable instructions. Executing the machine-readable instructions may cause the one or more physical processors to facilitate providing views of virtual content in an interactive space. The machine-readable instructions may include one or more computing program components. The computer program components may include one or more of a control component, an input component, a mode component, and/or other components.

The control component may be configured to control the light source to generate views of virtual content. The views may be generated by forming images of the virtual content. The virtual content may be perceived by the viewing user as being present within the three-dimensional light field. By way of non-limiting illustration, the light source may be controlled to generate one or more of a view of an instance of the virtual gallery, a view of an instance of a first virtual object, and/or other views of other virtual content. The first virtual object may be perceived as being removably attached to a first support in the set of supports of the virtual gallery.

The input component may be configured to obtain user input for manipulating virtual content in an interactive space. The user input may comprise gesture based input and/or other input.

The mode component may be configured to determine operational modes of the virtual gallery. In some implementations, an operational mode of the virtual gallery may correspond to enablement or disablement of a feature of removable attachment of individual virtual objects to individual supports of the virtual gallery. In some implementations, individual operational modes of the virtual gallery may be determined based on positional state of the virtual gallery.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
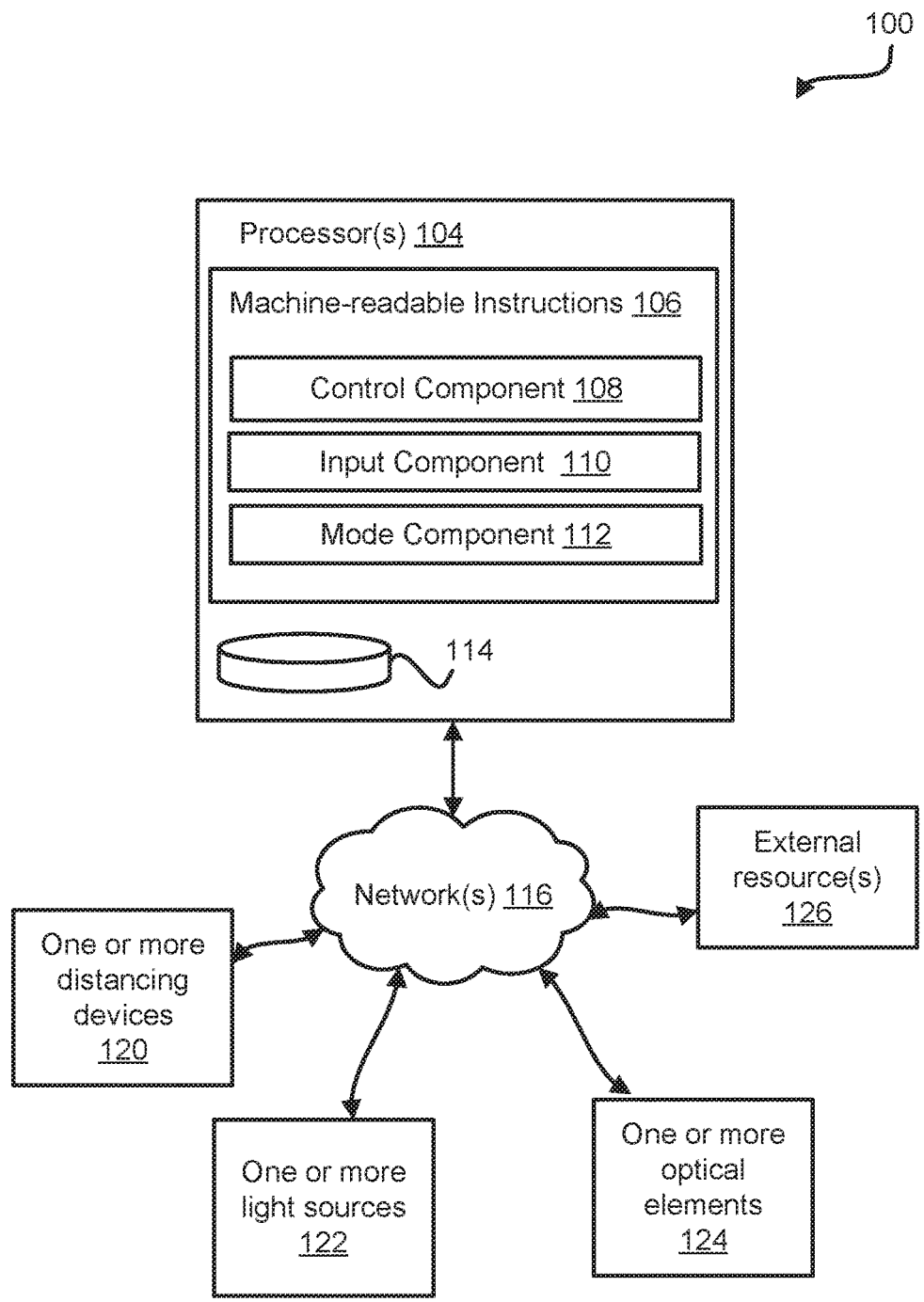
FIG. 1 illustrates a system configured to provide views of virtual content in an interactive space, in accordance with one or more implementations.

FIG. 1 shows a system 100 configured to provide views of virtual content in an interactive space. The interactive space may include one or more of a virtual reality environment, an augmented reality environment, and/or other interactive spaces. An "augmented reality environment," as used herein, may refer to a space that represents a virtual environment that may be superimposed over a perspective of a physical real-world environment around a user. An augmented reality environment may include attributes of a virtual environment, including virtual objects superimposed over portions of the physical environment. In some implementations, an augmented reality environment may represent physical objects in the physical world as virtual objects in the augmented environment. A virtual reality environment may refer to a space that includes the virtual environment. In the context of interactive spaces, the terms "space" and "environment" may be used interchangeably herein.

The human perceptual system has the ability to combine various sensory cues in an efficient manner in order to perceive physically plausible virtual content in real-world space. For example, the human perceptual system has the ability to integrate, among other things, sensory cues such as one or more of luminance, depth, and/or shape information to form or perceive coherent virtual content in the real-world. As a result, the properties of the human perception may be exploited through visual systems, as described herein, employing hardware and/or software architectures to form virtual content (e.g., via digital images) that may be located and/or perceived to be located in real-world space by virtue of the principles of the depth sensitive modules of the human brain.

The system 100 may include one or more of one or more physical processors 104, one or more distancing devices 120, one or more light sources 122, one or more optical elements 124, and/or other components. In some implementations, one or more components of system 100 may be incorporated in a headset (not shown in FIG. 1) configured to be installed (e.g., worn) in the head of a user, and/or other devices. The headset may comprise one or more of an head-mounted display (HMD), glasses, goggles, and/or other devices. By way of non-limiting illustration, one or more optical elements 124 may comprise at least part of a visor of an HMD. In some implementations, one or more components of system 100 may be included in one or more devices external to a headset. For example, one or more components may be included in one or more of a desktop computer, a laptop computer, other mobile computer configurations, and/or other computing devices. By way of non-limiting illustration, one or more physical processors 104 and/or other components may be included in a mobile computing device external to a headset. The headset may be tethered and/or otherwise connected to the one or more external devices. Such connection may be wired (e.g., USB, HDMI, and/or other wired connections) and/or wireless (e.g., Bluetooth, Wi-Fi, and/or other wireless connections).

In some implementations, individual light sources of one or more light sources 122 may comprise one or more of a liquid crystal display (LCD), a light emitting diode (LED) display, surface-conduction electron-emitter display (SED), a plasma display, a transparent organic light emitting diode (OLED) display, a MEMS mirror based display, liquid crystal on silicon (LCoS) display, digital light projector (DLP), a laser, an RGB laser, and/or other light sources. An individual light source may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more light sources 122 may be positioned relative to one or more optical elements 124, such that light emitted from one or more light sources 122 may be reflected by one or more optical elements 124 to one or more eyes of the user. In some implementations, a set of components comprising at least one light source and at least one optical element may be referred to as an "image-forming component."

An optical element may comprise one or more reflective, or partially reflective surfaces on a visor. An optical element may be formed from a reflective or partially reflective material. A reflective and/or partially reflective material may comprise one or more of ZEONEX, polycarbonate, PMMA, and/or other materials. The user may perceive the reflected light as virtual content in a perceived three-dimensional light field within their field-of-view. In some implementations, control of position and/or light generation of individual light sources 122 may impact one or more aspects of a perceived three-dimensional light field and/or virtual content within the perceived the three-dimensional light field. One or more aspects of a perceived three-dimensional light field may include one or more of a perceived distance of the three-dimensional light field from the user, a depth of the perceived three-dimensional light field, and/or other aspects of the three-dimensional light field. One or more aspects of virtual content within a three-dimensional light field may include one or more of a perceived distance of the virtual content from a user, a depth of the virtual content, a size of the virtual content, and/or other aspects of the virtual content. For example, in some implementations, moving a position of an individual light source closer to an optical element may cause virtual content to be perceived closer to the user; while moving the position of the individual light source farther from the optical element may cause the virtual content to be perceived farther from the user.

In some implementations, individual optical elements of one or more optical elements 124 may comprise a waveguide and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and directed out of the waveguide toward one or more eyes of a user.

In some implementations, one or more optical elements 124 may be arranged on a headset such that light rays generated by one or more light sources 122 may be directed at one or more optical elements 124, coupled into one or more optical elements 124, and directed out of one or more optical elements 124 into an eye of a user. The images of virtual content may be projected onto a retina of the eye such that the images may be superimposed over the user's view of the real world.

Figure 10:
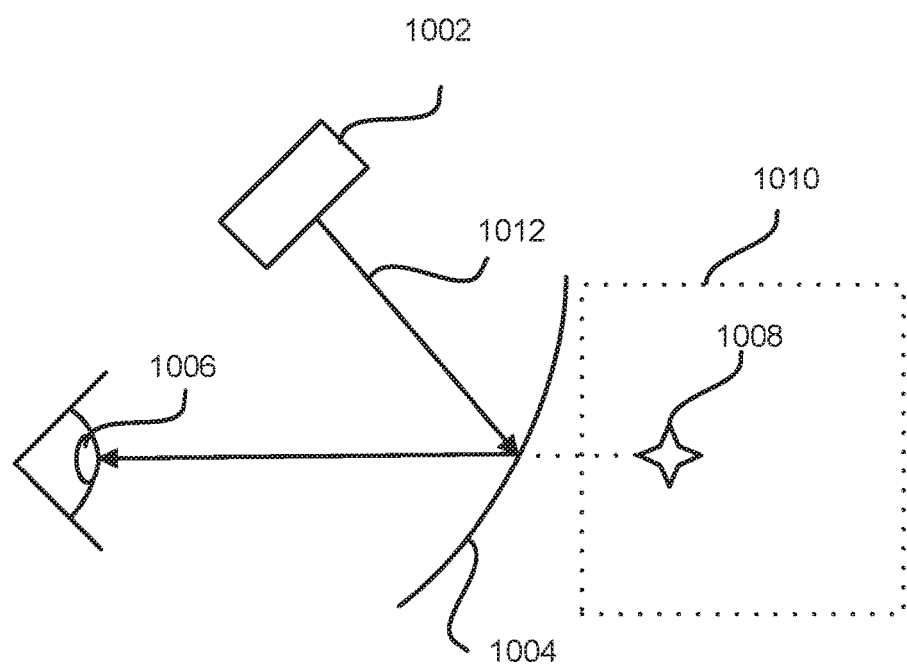
FIG. 10 illustrates an exemplary arrangement of a light source and an optical element configured to generate images forming views of virtual content within an interactive space.

By way of non-limiting illustration, FIG. 10 shows an exemplary configuration of a light source 1002 and an optical element 1004 for generating virtual content 1008 to be perceived within a three-dimensional light field 1010. In some implementations, one or more of light source 1002, optical element 1004, and/or other components may be incorporated into a headset, and/or other devices. FIG. 10 shows a light beam 1012 emitted from light source 1002. In some implementations, light beam 1012 may reflect off optical element 1004 into a user's eye 1006. In some implementations, light beam 1012 may be coupled into optical element 1004, propagated through optical element 1004, and directed out of optical element 1004 into eye 1006. The light beam 1012 may be part of light generated by light source 1002 to depict a digital image that may correspond to virtual content 1008 to be perceived within the user's field of view. In some implementations, position of light source 1002 may be incrementally adjusted to obtain incremental adjustments to a perceived range of virtual content 1008 within three-dimensional light field 1010. In some implementations, the depth and/or bounds of three-dimensional light field 1010 may be limited by an adjustable range of light source 1002 closer to and/or farther from optical element 1004.

It is noted that the configuration in FIG. 10 illustrates an arrangement of components to present images forming views of virtual content to one eye of a user. In a headset, a second arrangement may be provided and arranged so that a second set of images may be presented to the other eye. The images presented to both eyes may comprise stereo image pairs.

Returning to FIG. 1, one or more physical processors 104 may include and/or may be coupled to non-transitory electronic storage media 114 and/or other components. The non-transitory electronic storage media 114 may be configured to store virtual content information and/or other information. Virtual content information may define virtual content. Virtual content may be defined based on one or more of size, shape, color, geometry, functionality, and/or other defining aspects. In some implementations, virtual content may include one or more of one or more virtual galleries, one or more virtual docks, one or more virtual objects, and/or other virtual content.

A virtual gallery may comprise a virtual object perceived to be present in the real-world environment. The virtual gallery may be configured to be perceived as holding one or more virtual objects. The virtual gallery may be configured to be manipulated in an interactive space. In some implementations, the virtual gallery may include a virtual handle and/or other component that may facilitate user interaction with the virtual gallery. By way of non-limiting illustration, the virtual gallery may be rotatable, translatable, expandable, contractible, and/or may be manipulated in an interactive space in other ways. In some implementations, manipulation of a virtual gallery in an interactive space may be based on user input and/or other input (see, e.g., input component 110).

A virtual gallery may be configured as a user interface and/or user interface tool within the interactive space for functional organization of virtual objects and/or representations of virtual objects utilized within the interactive space. In some virtual and/or augmented reality systems, the virtual objects perceived and/or manipulated by a user may simply be placed or positioned in three-dimensional space such that they may appear as "floating" in space until the user utilizes them once again. This apparent lack of organization may be frustrating for some users. The virtual gallery may be configured through its shape, form, and/or other features to provide a user with an tool for which virtual objects and/or representations of virtual objects may be mounted, stacked, stored, and/or organized in other ways. Further, manipulation or movement of the virtual gallery itself may allow a user to manipulate or move multiple virtual objects at once by virtue of their simulated attachment to the virtual gallery. In some implementations, the virtual gallery may have a form that depicts known real-world objects used for real-world organizational purposes, such as one or more of a briefcase, a shelf, a cabinet, a dresser, a night stand, and/or other real-world objects.

In some implementations, a virtual gallery may be perceived as a voluminous body. For example, the virtual gallery may be perceived as having a visibly perceivable height, thickness, width, and/or other dimension. In some implementations, a virtual gallery may be perceived as having little or no volume. For example, the virtual gallery may be formed from a set of line segments such that a height and/or width may be perceivable, but the virtual gallery may have no perceivable thickness.

A virtual dock may comprise a virtual object perceived to be present in the real-world environment. The virtual dock may be configured such that a virtual gallery may be mountable upon the virtual dock. The virtual dock may be configured to be manipulated in an interactive space. By way of non-limiting illustration, the virtual dock may be rotatable, translatable, expandable, contractible, and/or may be manipulated in an interactive space in other ways. In some implementations, manipulation of a virtual dock in an interactive space may be based on user input and/or other input (see, e.g., input component 110). A virtual gallery mounted upon a virtual dock may appear as being "locked" to the virtual dock. By way of non-limiting illustration, in a "locked" state, a virtual gallery may not be moved on its own by a user within the interactive space. By way of non-limiting illustration, manipulation of a virtual dock having a virtual gallery mounted thereon may cause both the virtual dock and virtual gallery to be manipulated in unison. A virtual gallery locked to a virtual dock may cause the virtual gallery and the virtual dock to act like a single rigid object.

In some implementations, a virtual gallery may comprise a set of supports and/or other components. The set of supports may be perceived as "shelves" on which virtual object may be mounted, placed, and/or otherwise held. One or more virtual objects depicted as being held by a virtual gallery may be depicted as being located on an individual support of the virtual gallery. Individual supports may be positioned at discrete locations on the virtual gallery. For example, the set of supports may be arranged with regular spacing on the virtual gallery, and/or arranged in other ways. In some implementations, the set of supports may include at least one support. Individual supports may be distinctly visible on a virtual gallery. For example, an individual support may be visually represented as a shelf where one or more virtual objects may be placed. Individual supports may have other shapes and/or forms.

A virtual gallery may be configured to simulate removable attachment of individual virtual objects to individual supports of the virtual gallery. When attached, the virtual object may be referred to as being in an "attached state." In some implementations, attachment of a virtual object to a support may comprise at least one surface of the virtual object simulating a contact with at least one surface of a given support. In some implementations, attachment of a virtual object to a support may comprise at least one surface of the virtual object being within a threshold distance from at least one surface of a given support. By way of non-limiting illustration, a virtual object may be "attached" to a support yet may be visually represented as "hovering" over the support by the threshold distance, and/or other distances. When a virtual object is in an attached state attached to a support of a virtual gallery, the virtual object may move with the virtual gallery as the virtual gallery is manipulated within an interactive space.

In some implementations, a detachment of a virtual object from a support of a virtual gallery may be facilitated based on the virtual object being moved away from the virtual gallery. In some implementations, when a virtual object is detached from a support, changes in position (e.g., also referred to as "positional state") of the virtual object may be facilitated. Changing positional state of individual virtual objects may be based on user input and/or other input (see, e.g., input component 110). In some implementations, a detachment of virtual object from a support may require an amount of simulated "force" to be applied to the virtual object. Application of simulated force to individual virtual objects may be based on user input and/or other input (see, e.g., input component 110).

Individual virtual objects may be defined by one or more of size, shape, color, surface indicia, functionality, and/or other defining aspects. In some implementations, shapes of virtual objects may include one or more of spherical, planar, two- or three-dimensional polyhedron, and/or other shapes. Surface indicia on a virtual object may include one or more of text, graphics, images, and/or other indicia. In some implementations, surface indicia on a virtual object may identify the virtual object.

In some implementations, individual virtual objects may be associated with one or more application programs. An individual virtual object may be associated with an individual application program by virtue of the individual virtual object providing an interface to the individual application program. An application program may include one or more of a web-browser, a video game, a word processor, a three-dimensional object file, a gallery of application programs, a virtual desktop, applications running on a virtual desktop, personal contacts, a presentation generation program, one or more software-enabled applications used in an interactive space, and/or other application programs.

By way of non-limiting illustration, a first virtual object may be associated with a first application program. The first virtual object may comprise a planar-shaped virtual object and/or other virtual object. The first application program may comprise a web browser and/or other application program. The first virtual object may be configured to depict a web browser interface. The first virtual object may be configured to be presented in front of a user as an interface to access to the Internet. Input into the web browser may be provided by user input and/or other input (see, e.g., input component 110).

Individual virtual objects may be of one or more virtual object types. In some implementations, virtual object types may include one or more of a single-instance type, a multi-instance type, and/or other object types.

An instance of a single-instance type virtual object may be a standalone instance of the virtual object within an interactive space. The instance of the single-instance type virtual object may persist as the standalone instance of the virtual object within the interactive space. By way of non-limiting illustration, removal of an instance of an individual virtual object of a single-instance type from an attachment with an individual support may facilitate changes in positional state of the individual instance of the individual virtual object. That is, the instance of the individual virtual object may be perceived as being removed from attachment and/or manipulated in the interactive space in other ways.

In some implementations, an instance of a single-instance type virtual object associated with an application program may maintain state of the application program. The state of the application program may be changed based on user input (e.g., input into a web browser causing a webpage to be loaded). The instance of the single-instance type virtual object may "save" the state of the application program. That is, the state of the application program may persist with the instance of the single-instance type virtual object.

An instance of a multi-instance type virtual object may facilitate generating other instances of the virtual object within an interactive space. The instance of the multi-instance type virtual object may persist as one of many instances of the virtual object within the interactive space. By way of non-limiting illustration, removal of an instance of an individual virtual object of a multi-instance type (the "initial" virtual object) from an attachment with an individual support may cause the instance of the individual virtual object of the multi-instance type to be perceived as maintaining the attachment with the individual support, but may cause one or more other instances of the individual virtual object to be generated. The generation of an other instance may be perceived as if it were being drawn out from, or copied from, the initial instance of the individual virtual object of the multi-instance type. The other instance of the virtual object may be manipulated in the interactive space such that changes in positional state of the other instance of the individual virtual object may be facilitated, while the initial instance of the virtual object may remain attached to the support. In some implementations, the other instance of the individual virtual object may be another multi-instance type virtual object or a single-instance type virtual object.

In some implementations, individual virtual objects may be associated with one or more other virtual objects. In some implementations, a virtual object may be associated with one or more other virtual objects based on the virtual object facilitating generation of views of the one or more other virtual objects. By way of non-limiting illustration, a first virtual object may be associated with a second virtual object and/or other virtual objects. The association may be based on a view of the second virtual object being generated in response to the first virtual object achieving a threshold positional state (e.g., with respect to a virtual gallery and/or other reference point). In some implementations, generation of the view of the second virtual object may cause a view of the first virtual object to be removed. For example, when the first virtual object achieves a first positional state (e.g., a perceived location within three-dimensional space with respect to a virtual gallery, the user, and/or other reference point), the first virtual object may disappear and a view of the second virtual object may be generated. The second virtual object may be generated to appear at the same perceived location (e.g., having the same positional state) and/or one or more other locations. The first virtual object may be considered a "generic" form of the second virtual object. The first virtual object may have a generic shape, e.g., a sphere, which may be more easily manipulated in the interactive space. The first virtual object may take up less space when mounted onto a virtual gallery. The first virtual object may act as a surrogate of the second virtual object.

In some implementations, state of an application program associated with an instance of a single-instance type virtual object may persist with instances of other virtual objects that may be associated with the instance of the single-instance type virtual object. By way of non-limiting illustration using the above example of the first virtual object associated with the second virtual object, an application program associated with the first virtual object may become associated with the second virtual object once the second virtual object is generated and the first virtual object disappears. A state of the application program associated with the first virtual object may persist to the second virtual object once generated. For example, a particular web page of an internet browser application associated with the first virtual object may also be associated with the second virtual object.

Figure 2:
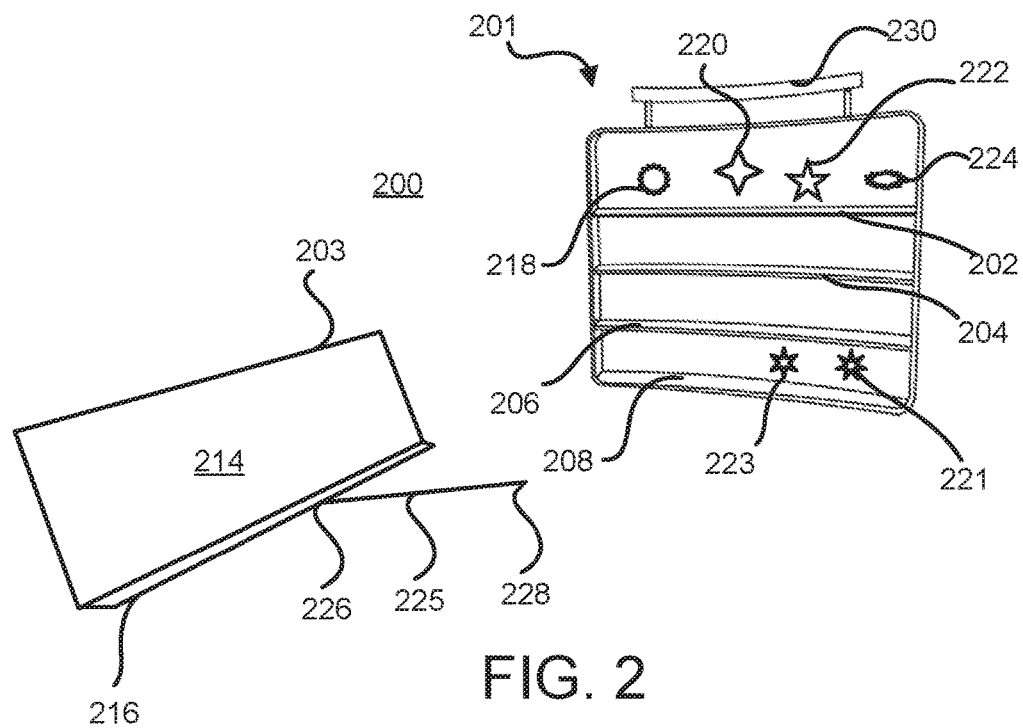
FIG. 2 illustrates a virtual gallery within an interactive space.

FIG. 2 illustrates a view of virtual content within an interactive space 200. The virtual content may include one or more of a virtual gallery 201, one or more virtual objects, a virtual dock 203, and/or other virtual content. The one or more virtual objects may include one or more of a first virtual object 218, a second virtual object 220, a third virtual object 222, a fourth virtual object 224, a fifth virtual object 221, a sixth virtual object 223, and/or other virtual objects. In some implementations, individual virtual objects may be represented as spheres as a generic shape, and/or other shapes. The depiction of the virtual objects as star shapes is provided for illustrative purposes only and is not to be considered limiting.

In some implementations, virtual gallery 201 may include one or more of a set of supports, a handle 230, and/or other components. The set of supports may include one or more of a first support 202, a second support 204, a third support 206, a fourth support 208, and/or other supports. Individual virtual objects may be removably attachable to individual supports. By way of non-limiting illustration, one or more of first virtual object 218, second virtual object 220, third virtual object 222, fourth virtual object 224, and/or other virtual objects may be removably attached to first support 202. By way of non-limiting illustration, one or more of fifth virtual object 221, sixth virtual object 223, and/or other virtual objects may be removably attached to fourth support 208. It is noted that the depicted attachments are provided for illustrative purposes only and are not to be considered limiting. For example, individual virtual objects may be removed from individual supports, attached to other supports, positioned within three-dimensional space, and/or may be manipulated in other ways.

The handle 230 may provide a perceived grabbable portion of virtual gallery 201. For example, moving the virtual gallery 201 within interactive space 200 may be facilitated by user input comprise gesture-based input of "grabbing" handle 230 and moving virtual gallery 201 as desired (see, e.g., discussion of input component 110 of FIG. 1).

The virtual dock 203 may provide a virtual structure for removably mounting virtual gallery 201. The virtual dock 203 may include a first support 214, a second support 216, a tether 225, and/or other components. The first support 214 may be attached to second support 216 at a right angle and/or other angle to provide a support structure on which virtual gallery 201 may be perceived to be placed. For example, first support 214 and second support 216 may form a type of easel on which virtual gallery 201 may be placed.

The virtual tether may include a first end 226 proximal to virtual dock 203 and depicted as being attached to virtual dock 203, and a second end 228 opposite of first end 226 and extending outward from virtual dock 203. The second end 228 of tether 225 may be configured to be attached to a reference point, such as one or more of a user, a point in three-dimensional space, and/or other locations. By attaching tether 225 to a reference point, the positioning of virtual dock 203 (and virtual gallery 201 mounted thereon), may be maintained at a fixed location for easy access by a user. By attaching the tether 225 to the user, such as at the users waist, the positioning of virtual dock 203 (and virtual gallery 201 mounted thereon) may follow the movement of the user such that virtual dock 203 (and virtual gallery 201 mounted thereon) may be within reach of the user, even if they move around within the interactive space.

Figure 3:
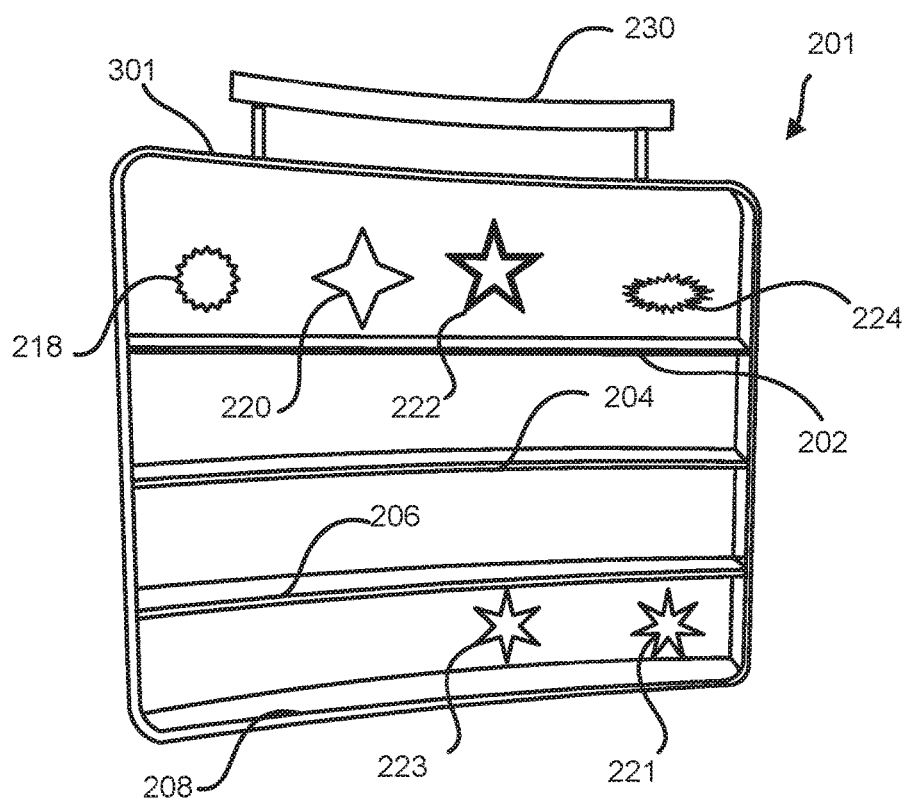
FIG. 3 illustrates a virtual gallery within an interactive space.

FIG. 3 illustrates another view of virtual gallery 201 and one or more virtual objects depicted as being held by virtual gallery 201. As shown, virtual gallery 201 may have a substantially rectangular shape. The virtual gallery 201 may comprise a frame 301 configured to provide a structural element for supporting the set of supports. Virtual gallery 201 may be curved and/or may have other forms. The handle 230 may extend from a top portion of frame 301 and/or from other portions of frame 301.

Figure 4:
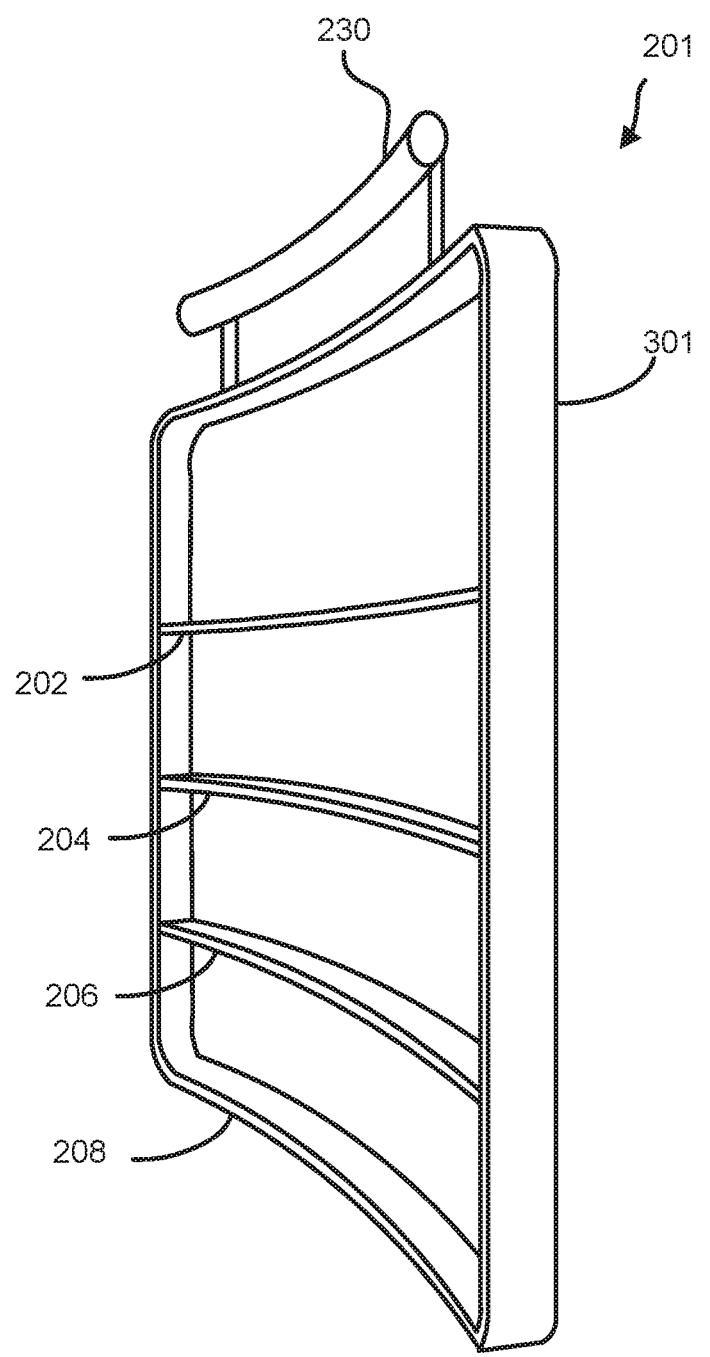
FIG. 4 illustrates a virtual gallery within an interactive space.

FIG. 4 illustrates yet another view of virtual gallery 201. As shown, virtual gallery 201 may have a perceivable thickness, "T." The curvature of virtual gallery 201 is more pronounced in the illustration of FIG. 4.

Returning to FIG. 1, individual distancing devices of one or more distancing devices 120 may be configured to generate output signals conveying position information and/or other information. The position information may include positions of one or more surfaces of one or more real-world objects within a real-world environment. In some implementations, a position of a surface may be expressed as one or more of distance from an individual distancing device, an angle from reference line (e.g., a horizontal line), and/or other information. By way of non-limiting illustration, a position may be represented as a vector having vector components. In some implementations, one or more distancing devices 120 may include one or more of a camera, a three-dimensional scanner, a depth sensor or depth camera, a rangefinder, a laser gauge, a time-of-flight sensor, an IR camera/emitter pair, a passive, structured, or unstructured light stereo pair, and/or other devices. In some implementations, sensor output of an individual distancing device may comprise a point cloud and/or other output. A point cloud may include a set of points that may lie on surfaces of real-world objects within a range of the distancing device, and/or other sensor output.

In some implementations, a distancing device may comprise a camera. Output of the camera may comprise information defining images of real-world objects. Position information including position of the real-world object in the images may be determined through one or more object recognition, position triangulation, and/or other image-based techniques.

The one or more physical processors 104 may be configured by machine-readable instructions 106. Executing machine-readable instructions 106 may cause one or more physical processors 104 to facilitate providing views of virtual content in an interactive space. The machine-readable instructions 106 may include one or more of a control component 108, an input component 110, a mode component 112, and/or other components.

In some implementations, control component 108 may be configured to control one or more components of system 100. In some implementations, control component 108 may be configured to control individual light sources of one or more light sources 122, and/or other components. In some implementations, control of individual light sources of one or more light sources 122 may include one or more of control of light generation and/or emission in accordance with instances of virtual content to be generated and presented in an interactive space, control of position of individual light sources of one or more light sources 122, and/or other types of control.

By way of non-limiting illustration, control component 108 may be configured to control a first light source of one or more light sources 122 to generate images forming views of virtual content. The views of the virtual content may be generated such that the virtual content may be perceived within a three-dimensional light field within a user's field-of-view. The control component 108 may be configured to control the first light source and/or other light sources to generate an image forming a view of an instance of a virtual gallery having a set of supports, and/or other virtual content. The control component 108 may be configured to control the first light source and/or other light sources to generate an image forming a view of an instance of a first virtual object to be perceived as being removably attached to a first support in the set of supports of the virtual gallery.

The input component 110 may be configured to obtain user input for manipulating virtual content in an interactive space. The user input may comprise gesture based input and/or other input. In some implementations, user input may be derived from one or more of sensor output of one or more distancing device 120, sensor output from one or more other sensors, and/or other sources. By way of non-limiting illustration, input component 110 may be configured to detect and/or recognize one or more real-world objects based on sensor output from one or more distancing devices 120 and/or other sources. A real-world object that may be recognized may include, for example, a human hand. One or more real-world objects may be recognized based on one or more point clouds having points lying on one or more surface of the one or more real-world objects. By way of non-limiting illustration, a point cloud having a shape of a human hand may be recognized as a human hand.

In some implementations, input component 110 may be configured to identify gestures and/or actions being performed by one or more real-world objects. A gesture and/or action may include one or more of reaching, grabbing, releasing, swiping, pinching, pulling, throwing, pointing, and/or other gestures and/or actions of real-world objects. By way of non-limiting illustration, input component 110 may utilize one or more gesture recognition techniques to identify one or more gestures and/or actions being performed by one or more real-world objects. The input component 110 may be configured to provide one or more identified gestures and/or actions as user input for manipulating virtual content in an interactive space.

By way of non-limiting illustration, input component 110 may be configured to obtain user input comprising gesture-based input for manipulating a virtual gallery in an interactive space. A virtual gallery may be manipulated based on one or more of a gesture of grabbing the handle of the virtual gallery, a gesture of holding the handle of the virtual gallery, changing positional state of the virtual gallery while the handle is in a held state, positioning the virtual gallery on a virtual dock, a gesture of releasing the handle of the virtual gallery from a held state, and/or other input.

Input component 110 may be configured to obtain user input comprising gesture-based input for manipulating one or more virtual objects. A virtual object may be manipulated based on one or more of a gesture of grabbing the virtual object, a gesture of holding the virtual object, changing positional state of the virtual object while the virtual object is in a held state, a gesture of releasing the virtual object from a held state, a gesture of throwing the virtual object, and/or other input.

In some implementations, input component 110 may be configured to determine an amount of simulated "force" a user may be applying to a virtual object and/or virtual gallery. In some implementations, force may be determined based on one or more of a speed at which a gesture may be performed, a velocity at which a gesture may be performed, an acceleration at which a gesture may be performed, and/or other information. By way of non-limiting illustration, the faster a user moves their hand while holding a virtual object, the greater a simulated force may be determined to be applied to the virtual object.

In some implementations, positions of one or more features of a hand may be determined through one or more iterations including operations of determining estimated positions of individual features from estimated positions of other ones of the features. Such an iterative procedure may be performed as output from a distancing device may be obtained. The output may be obtained based on a sampling rate of a distancing device.

In some implementations, an estimated position of a first feature may be determined from position information and/or other information. In an iteration, an estimated position of a second feature may be determined from the estimated position of the first feature. An estimated position of a set of features may be determined from the estimated position of the second feature. Another estimated position of the first feature may be determined from the estimated position of the set of features. An estimated position of the set of features may include a set of positions wherein individual positions in the set of positions correspond to individual features in the set of features. The estimated positions of the first feature may be compared to determine a difference between those positions.

Based on the difference being equal to or below a threshold distance, the positions of one or more of the first feature, second feature, set of features, and/or other features may be specified by the corresponding estimated featured positions used in the current iteration. The threshold distance may be within a range of 1 to 10 millimeters, and/or other ranges.

Based on the difference being equal to or above a threshold distance, one or more further iterations may be performed. At an iteration where a difference in estimated positions of the first feature may be below a threshold distance, the positions of one or more features may be specified by the estimated positions of the one or more features used in that iteration.

By way of non-limiting illustration, given a position of a first feature of a hand, a position of a second feature may be determined based on one or more of a range of distances from the position of the first feature that may be anatomically possible to correspond to the position of the second feature, one or more directions from the position of the first feature that may be anatomically possible to point to the position of the second feature, and/or other information. By way of non-limiting illustration, given a position of a wrist of a hand, a position of a thumb may be determined based on one or more of a range of distances from the wrist position that may be anatomically possible to correspond to the position of the thumb, one or more directions from the position of the wrist that may be anatomically possible to point to the position of the thumb, and/or other information.

In some implementations, mode component 112 may be configured to determine individual operational modes of individual virtual galleries. In some implementations, an operational mode of a virtual gallery may correspond to enablement or disablement of a feature of removable attachment of individual virtual object to individual supports of the virtual gallery. In some implementations, individual operational modes of individual virtual galleries may be determined based on positional state of the individual virtual galleries.

By way of non-limiting example, in a first operational mode of a virtual gallery, removable attachment of individual virtual objects to individual supports of the virtual gallery may be enabled. In the first operational mode of a virtual gallery, attachment and/or detachment of individual virtual objects to individual supports of the virtual gallery may be accomplished by one or more techniques presented herein.

By way of non-limiting example, in a second operational mode of a virtual gallery, removable attachment of individual virtual objects to individual supports of the individual virtual gallery may be disabled. In the second operational mode of a virtual gallery, an individual virtual object that may be attached to an individual support may appear as being "locked" to the individual support. By way of non-limiting illustration, in the second operational mode, an individual virtual object that may be attached to an individual support may be unable to be detached from the individual support (e.g., until a change in operational mode occurs). In the second operational mode, an individual virtual object may be unable to be attached to an individual support. By way of non-limiting illustration, in the second operational mode, an individual virtual object may not achieve an attached state with an individual support even if the individual virtual object contacts the individual support and/or comes within a threshold distance from the individual support.

In some implementations, individual operational modes of an individual virtual gallery may correspond to individual positional states of the individual virtual gallery and/or other information. In some implementations, a positional state of a virtual gallery may correspond to a perceived position of the virtual gallery with respect to a user. By way of non-limiting illustration, a virtual gallery perceived to be positioned at a first location with respect to a user (e.g., engaged to a dock at eye level with the user) may correspond to a first operational mode of the virtual gallery. By way of non-limiting illustration, a virtual gallery perceived to be positioned at a second location with respect to a user (e.g., being "placed" on the ground) may correspond to a second operational mode of the virtual gallery.

Figure 5:
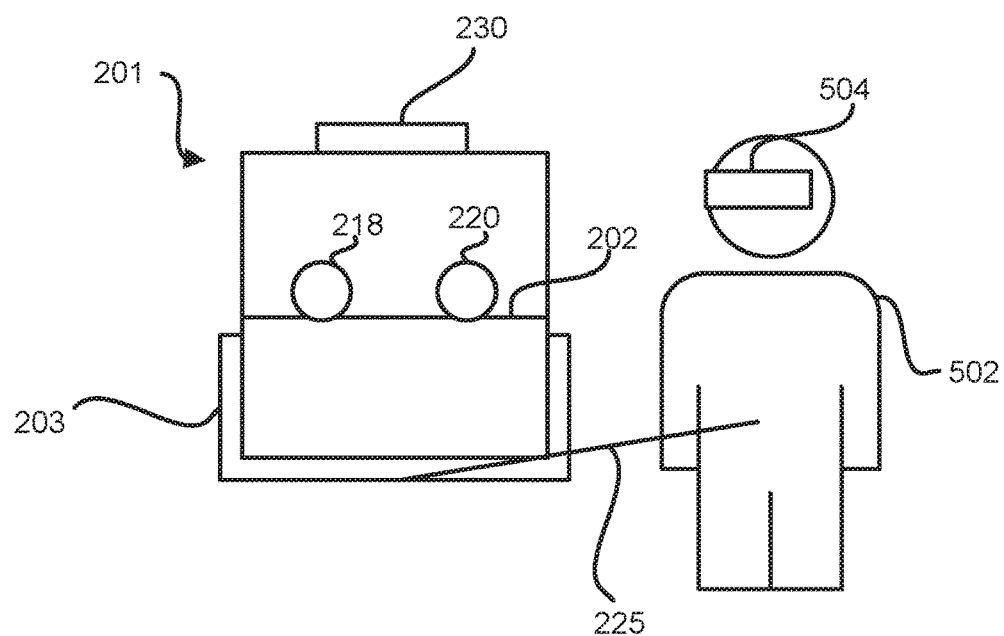
FIG. 5 illustrates a user and a virtual gallery within an interactive space.

FIG. 5 illustrates an exemplary configuration of virtual content with respect to a user 502 in an interactive space, in accordance with one or more implementations of system 100 (FIG. 1) presented herein. The user 502 may be wearing an HMD 504 and/or other components. The HMD 504 may include one or more components of system 100 (FIG. 1) to facilitate providing views of virtual content in the interactive space. The virtual content may include one or more of virtual gallery 201, virtual dock 203, first virtual object 218, second virtual object 220, and/or other virtual content. The virtual gallery 201 may include a set of supports and/or other components. The set of supports may include first support 202 and/or other supports. The first virtual object 218, second virtual object 220, and/or other virtual objects may be depicted as being held by first support 202. For illustrative purposes, first virtual object 218 may comprise single-instance type virtual object, and second virtual object 220 may comprise a multi-instance type virtual object.

In some implementations, virtual gallery 201 may be adjustable in one or both of positional state and/or rotational state. By way of non-limiting illustration, a user may provide input (e.g., gesture-based input and/or other input) to change one or both of a positional state and/or rotational state of virtual gallery 201. In some implementations, changing positional state may facilitate changing between operational modes of virtual gallery 201. As shown, virtual gallery 201 may be mounted to virtual dock 203. The tether 225 may be mounted to a reference point (e.g., user 502) such that the perceived relative position of the virtual gallery 201 and/or virtual dock 203 with respect to user 502 may be maintained should the user move about the interactive space.

Figure 6:
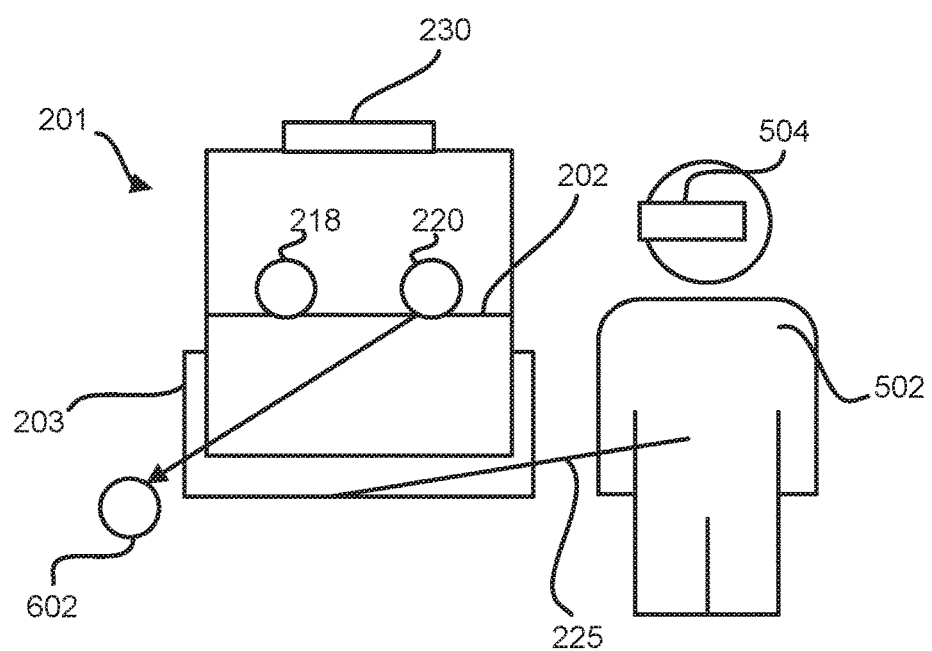
FIG. 6 illustrates a user and a virtual gallery within an interactive space.

FIG. 6 illustrates another configuration of virtual content with respect to user 502 in the interactive space. In particular, FIG. 6 illustrates an interaction of user 502 with second virtual object 220. User 502 may provide input (e.g., a gesture input such as "grabbing," "holding," and/or other input) to remove second virtual object 220 from first support 202. When second virtual object 220 is of the multi-instance type virtual object, the user input to remove second virtual object 220 may result in an associated virtual object 602 being generated and appearing as being "removed" from second virtual object 220. The associated virtual object 602 may comprise a new instance of second virtual object 220. The second virtual object 220 may persist in its attachment to first support 202. The user 502 may perceive themselves as holding on to associated virtual object 602 in three-dimensional space within their field-of-view. For illustrative purposes, the arm of user 502 is shown in a rested position to their side.

Figure 7:
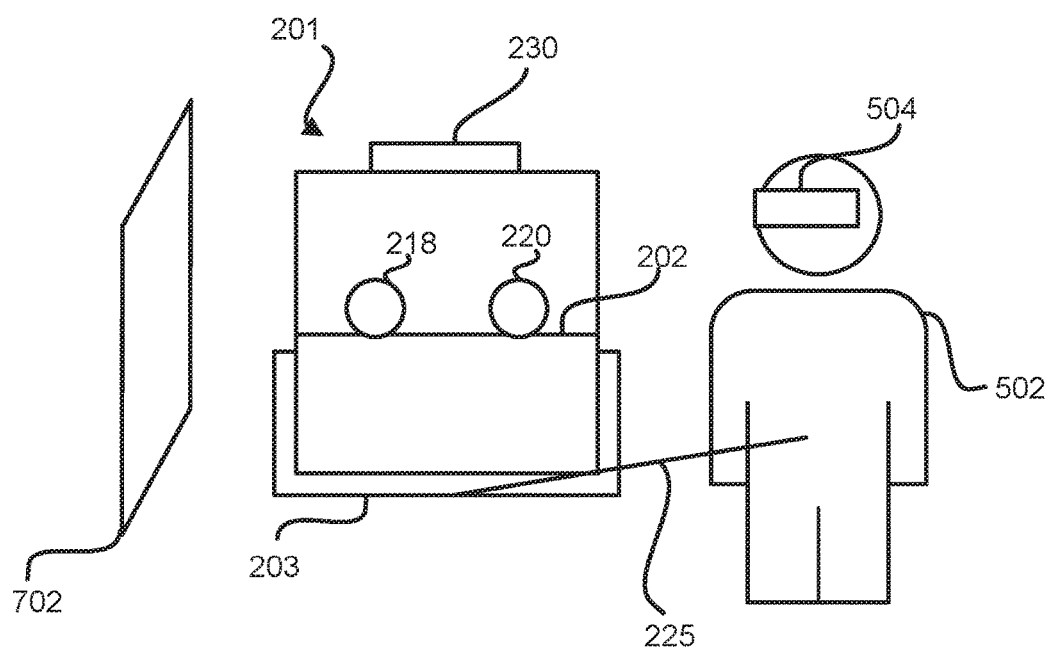
FIG. 7 illustrates a user and a virtual gallery within an interactive space.

FIG. 7 illustrates another configuration of virtual content with respect to user 502 in an interactive space. In particular, input by user 502 to grab virtual object 602 (FIG. 6) may allow user 502 to place virtual object 602 in three-dimensional space within their field-of-view by providing second input (e.g., a gesture input such as "releasing" a "hold" on virtual object 602, and/or other input). The second input may facilitate effectuating display of one or more additional associated virtual objects. For example, by releasing virtual object 602 (FIG. 6) in three-dimensional space within their field-of-view, a view of an yet another associated virtual object 702 may be generated. The virtual object 702 may be generated to be perceived in three-dimensional space in the users field-of-view at or near the position of release of virtual object 602 (FIG. 6).

In some implementations, virtual object 602 (FIG. 6) may be associated with an application program (e.g., a web browser and/or other application program). The application program may also be associated with the virtual object 702. The virtual object 702 may comprise a planar virtual object that may provide an interface to the application program. A state of the application program may persist with the virtual object 702 and/or virtual object 602 (FIG. 6). For example, the user 502 may perform a gesture of grabbing virtual object 702. The gesture of grabbing virtual object 702 may cause the virtual object 602 (FIG. 6) to reappear, and virtual object 702 may disappear. A state of the application program based on user interaction with virtual object 702 (e.g., loading a web page) may persist with virtual object 602 (FIG. 6).

Figure 8:
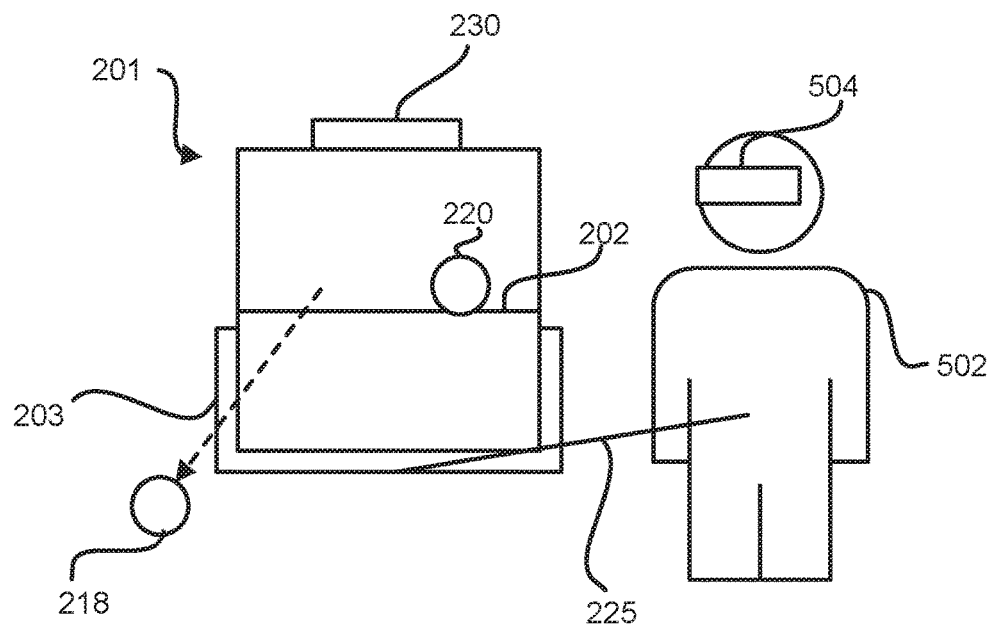
FIG. 8 illustrates a user and a virtual gallery within an interactive space.

FIG. 8 illustrates another exemplary configuration of virtual content with respect to user 502 in the interactive space. In particular, FIG. 8 illustrates an interaction of user 502 with first virtual object 218. The user 502 may provide input (e.g., a gesture input such as "grabbing," "holding," and/or other input) to remove first virtual object 218 from first support 202. When first virtual object 218 is of the single-instance type virtual object, the user input to remove first virtual object 218 may result in the instance of first virtual object 218 being removed from first support 202. The first virtual object 218 may be manipulated by the user to change its positional state within the users field-of-view. The user 502 may perceive themselves as holding on to first virtual object 218 in three-dimensional space within their field-of-view.

Figure 9:
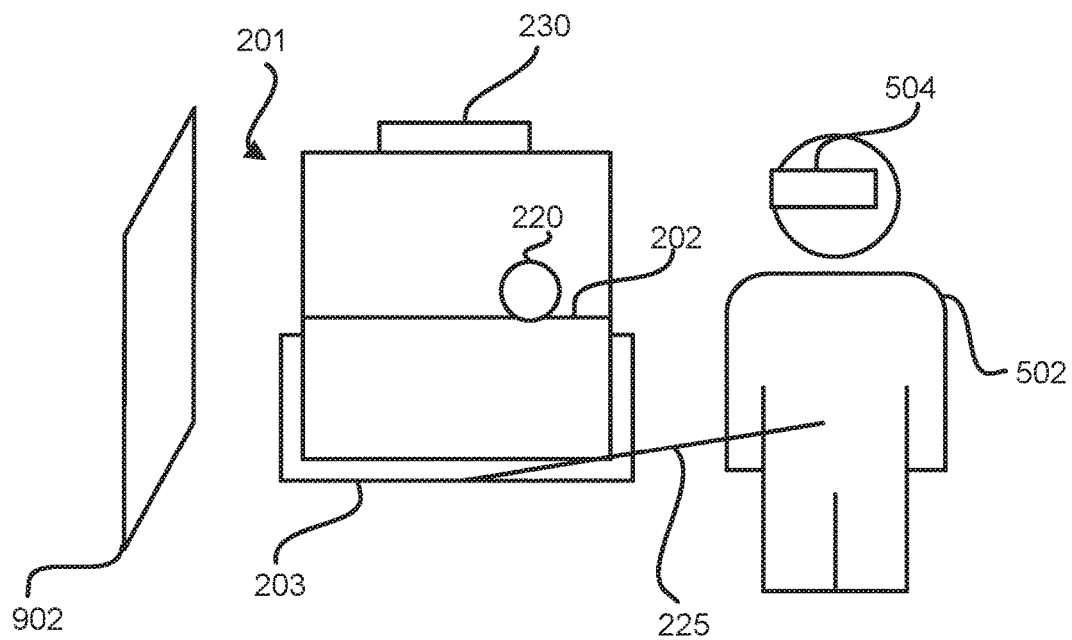
FIG. 9 illustrates a user and a virtual gallery within an interactive space.

FIG. 9 illustrates another configuration of virtual content with respect to user 502 in an interactive space. In particular, input by user 502 to grab first virtual object 218 (FIG. 8) may allow user 502 to place first virtual object 218 in three-dimensional space within their field-of-view by providing second input (e.g., a gesture input such as "releasing" the "grab" on first virtual object 218, "throwing" first virtual object 218, and/or other input). The change in positional state of first virtual object 218 may facilitate effectuating display of one or more associated virtual objects. For example, when first virtual object 218 (FIG. 8) achieves a threshold positional state (e.g., an arm's length away from user 502 and/or other position) in three-dimensional space, an associated virtual object 902 may be generated. The associated virtual object 902 may be generated to be perceived in three-dimensional space in the users field-of-view at or near the position of release of the first virtual object 218 (FIG. 8).

Returning to FIG. 1, processor(s) 104, one or more distancing device 120, one or more light sources 122, one or more optical elements 124, external resource(s) 126, and/or other components of system 100 may be operatively linked via one or more electronic communication links. For example, such electronic communication links may be established, at least in part, via network(s) 116. Network(s) 116 may comprise one or both of wired and/or wireless communications. It will be appreciated that this is not intended to be limiting and that the scope of this disclosure includes implementations in which processor(s) 104, one or more distancing device 120, one or more light sources 122, one or more optical elements 124, external resource(s) 126, and/or other components of system 100 may be operatively linked via some other communication media.

The external resource(s) 126 may include sources of information, hosts, external entities participating with system 100, providers of virtual content, and/or other resources. In some implementations, some or all of the functionality attributed herein to external resource(s) 126 may be provided by resources included in system 100.

The processor(s) 104 may include and/or have access to electronic storage 114, and/or other components. The processor(s) 104 may include communication lines or ports to enable the exchange of information with network(s) 116, electronic storage 114, and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 114 may comprise electronic storage media that electronically stores information. The electronic storage media of electronic storage 114 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a physical processor, a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination.

The processor 104 may be configured to execute components 108, 110, and/or 112. Processor(s) 104 may be configured to execute components 108, 110, and/or 112 by software; hardware; firmware; some combination of software, hardware, and/or firmware; and/or other mechanisms for configuring processing capabilities on processor(s) 104.

It should be appreciated that although components 108, 110, and/or 112 are illustrated in FIG. 1 as being co-located within a single processing unit, in implementations in which processor(s) 104 includes multiple processing units, one or more of components 108, 110, and/or 112 may be located remotely from the other components. The description of the functionality provided by the different components 108, 110, and/or 112 described above is for illustrative purposes and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, 112, and/or other components. As another example, processor(s) 104 may be configured to execute one or more additional components that may perform some or all of the functionality attributed to one of components 108, 110, and/or 112.

Figure 11:
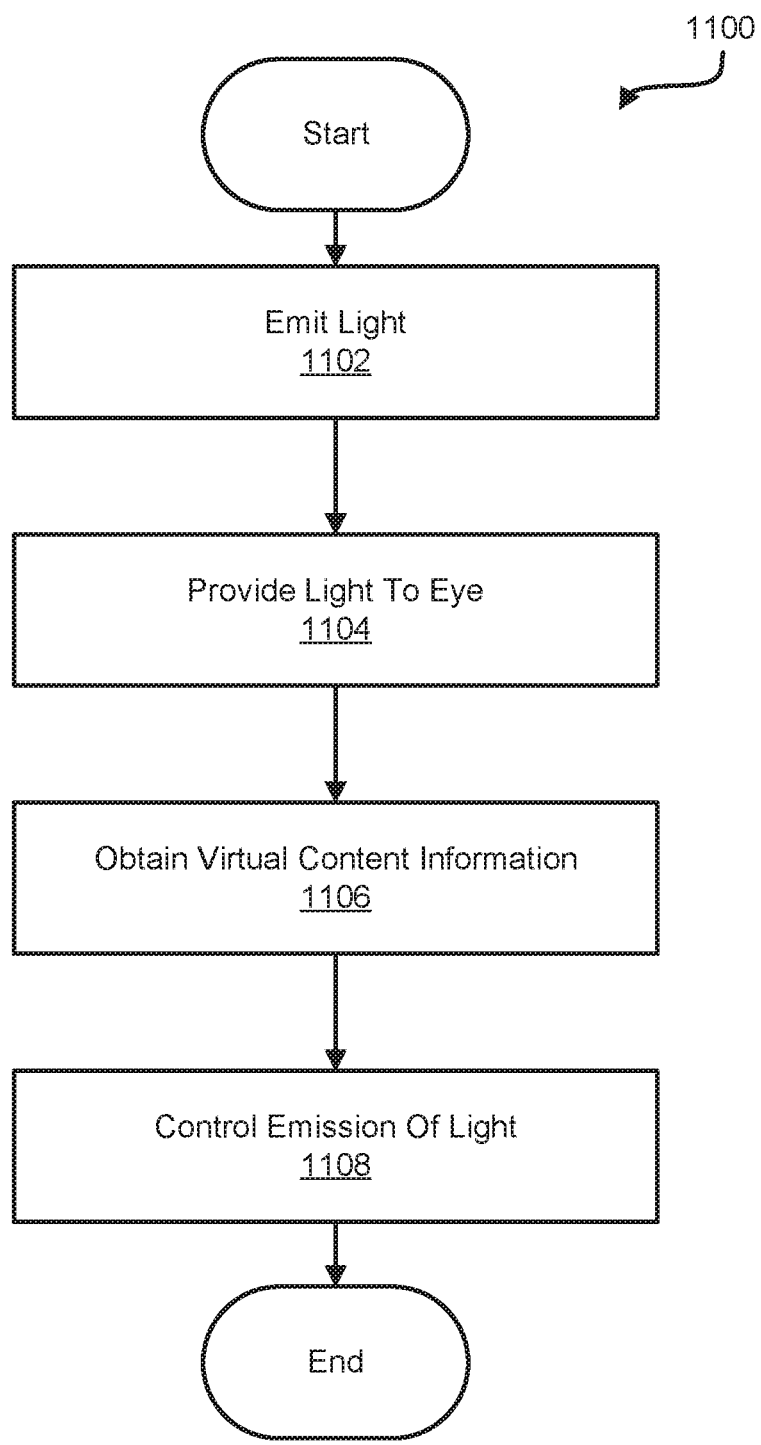
FIG. 11 illustrates a method to provide views of virtual content in an interactive space, in accordance with one or more implementations.

FIG. 11 illustrates a method 1100 of providing views of virtual content in an interactive space, in accordance with one or more implementations. The operations of method 1100 presented below are intended to be illustrative. In some implementations, method 1100 may be accomplished with one or more additional operations not described, and/or without one or more of the operations discussed. Additionally, the order in which the operations of method 1100 are illustrated in FIG. 11 and described below is not intended to be limiting.

In some implementations, method 1100 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, one or more distancing devices, one or more optical elements, and/or other components. The one or more processing devices may include one or more devices executing some or all of the operations of method 1100 in response to instructions stored electronically on electronic storage medium. The one or more processing devices may include one or more devices configured through hardware, firmware, and/or software to be specifically designed for execution of one or more of the operations of method 1100.

At an operation 1102, light may be emitted to form images of virtual content. In some implementations, operation 1102 may be performed using one or more light sources the same as or similar to one or more light sources 122 (shown in FIG. 1 and described herein).

At an operation 1104, the light may be provided to an eye of a user such that the images of the virtual content may be superimposed over views of a real-world environment to create the interactive space. In some implementations, operation 1104 may be performed using one or more optical elements the same as or similar to one or more optical elements 124 (shown in FIG. 1 and described herein).

At an operation 1106, virtual content information and/or other information may be obtained. The virtual content information may define virtual content. The virtual content may include one or more of one or more virtual galleries, one or more virtual docks, one or more virtual objects, and/or other virtual content. A virtual gallery may comprise a set of supports and/or other components. Individual supports positioned at discrete locations on the virtual gallery. The virtual gallery may be configured to simulate removable engagement of individual virtual objects to individual supports. In some implementations, operation 1106 may be performed by non-transitory electronic storage the same or similar to non-transitory electronic storage 114 (shown in FIG. 1 and described herein).

At an operation 1108, the emission of the light may be controlled to generate the images of the virtual content. The virtual content may be perceived by the user as being present in the real-world environment. By way of non-limiting illustration, the emission of the light may be controlled to generate an image of an instance of the virtual gallery. By way of non-limiting illustration, the emission of the light may be controlled to generate an image of an instance of a first virtual object to be perceived as being removably attached to a first support in the set of supports. In some implementations, operation 1108 may be performed by one or more physical processors executing a control component the same as or similar to control component 108 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide views of virtual content in an interactive space, the system comprising:
 a light source configured to emit light forming images of virtual content;
 an optical element, the optical element being configured to provide the light emitted from the light source to an eye of a user such that the images of the virtual content are superimposed over views of a real-world environment to create the interactive space;
 non-transitory electronic storage storing virtual content information, the virtual content information defining virtual content, the virtual content including: a virtual gallery, the virtual gallery comprising a set of supports, individual supports being positioned at discrete locations on the virtual gallery, the virtual gallery being configured to simulate removable engagement of individual virtual objects to the individual supports; and
 one or more physical processors configured by machine-readable instructions to: control the light source to generate the images forming the virtual content, the virtual content being perceived by the user as being present in the real-world environment, such that the light source is controlled to:
  generate an image of an instance of the virtual gallery; and generate an image of an instance of a first virtual object to be perceived as being removably attached to a first support in the set of supports;
  obtain a first user input for removal of the first virtual object from the first support to generate a chance in positional state of the individual instance of the first virtual object; and
  generate an image of an associated virtual object in a field of view of the user in the interactive space in response to obtaining a second user input directed to the removed individual instance of the first virtual object having the change in positional state.

2. The system of claim 1, wherein the first and second user inputs comprise gesture-based inputs.

3. The system of claim 1, wherein the individual virtual objects are of an individual virtual object type, wherein the virtual object types include a single-instance type and a multi-instance type;
 wherein removal of an instance of an individual virtual object of a single-instance type from an attachment with an individual support facilitates change in positional state of the individual instance of the individual virtual object; and
 wherein removal of an instance of an individual virtual object of a multi-instance type from an attachment with an individual support causes the instance of the individual virtual object to maintain the attachment with the individual support and another instance of the individual virtual object to be generated, such that changes in positional state of the other instance of the individual virtual object is facilitated.

4. The system of claim 1, wherein the individual virtual objects are associated with individual application programs.

5. The system of claim 4, wherein an individual virtual object associated with an individual application program provides an interface to the individual application program.

6. The system of claim 5, wherein a state of an individual application program associated with an individual virtual object persists with the individual virtual object.

7. The system of claim 1, further comprising a distancing device, the distancing device being configured to generate output signals conveying positions of one or more surfaces of one or more real-world objects.

8. The system of claim 1, wherein the virtual content further includes: a virtual dock, the virtual gallery being configured to mount upon the virtual dock.

9. The system of claim 8, wherein the virtual dock includes a tether, the tether having a distal end configured to be removably attached to a reference point within the interactive space.

10. The system of claim 1, wherein the image of the associated virtual object in a field of view of the user in the interactive space generated by the one or more physical processors in response to the obtained second user input of a release of the removed individual instance of the first virtual object at a location of at least a threshold positional state.

11. The system of claim 10, wherein the threshold positional state is a distance relative to the user in the interactive space.

12. A method to provide views of virtual content in an interactive space, the method comprising:
    emitting light to form images of virtual content;
    providing the light to an eye of a user such that the images of the virtual content are superimposed over views of a real-world environment to create the interactive space;
    obtaining virtual content information, the virtual content information defining virtual content, the virtual content including:
        a virtual gallery, the virtual gallery comprising a set of supports, individual supports being positioned at discrete locations on the virtual gallery, the virtual gallery being configured to simulate removable engagement of individual virtual objects to the individual supports; and
    controlling the emission of the light to generate the images of the virtual content, the virtual content being perceived by the user as being present in the real-world environment, including controlling the emission of the light to:
        generate an image of an instance of the virtual gallery; and
        generate an image of an instance of a first virtual object to be perceived as being removably attached to a first support in the set of supports;
    obtaining a first user input for removal of the first virtual object from the first support to generate a change in positional state of the individual instance of the first virtual object; and
    generating an image of an associated virtual object in a field of view of the user in the interactive space in response to obtaining a second user input directed to the removed individual instance of the first virtual object having the change in positional state.

13. The method of claim 12, wherein the first and second user inputs comprise gesture-based inputs.

14. The method of claim 12, wherein the individual virtual objects are of an individual virtual object type, wherein the virtual object types include a single-instance type and a multi-instance type;
    wherein removal of an instance of an individual virtual object of a single-instance type from an attachment with an individual support facilitates change in positional state of the individual instance of the individual virtual object; and
    wherein removal of an instance of an individual virtual object of a multi-instance type from an attachment with an individual support causes the instance of the individual virtual object to maintain the attachment with the individual support and another instance of the individual virtual object to be generated, such that changes in positional state of the other instance of the individual virtual object is facilitated.

15. The method of claim 12, wherein the individual virtual objects are associated with individual application programs.

16. The method of claim 15, wherein an individual virtual object associated with an individual application program provides an interface to the individual application program.

17. The method of claim 16, wherein a state of an individual application program associated with an individual virtual object persists with the individual virtual object.

18. The method of claim 12, further comprising a distancing device, the distancing device being configured to generate output signals conveying positions of one or more surfaces of one or more real-world objects.

19. The method of claim 12, wherein the virtual content further includes: a virtual dock, the virtual gallery being configured to mount upon the virtual dock.

20. The method of claim 19, wherein the virtual dock includes a tether, the tether having a distal end configured to be removably attached to a reference point within the interactive space.

21. The method of claim 12, wherein the image of the associated virtual object in a field of view of the user in the interactive space is generated in response to the obtained second user input of a release of the removed individual instance of the first virtual object at a location of at least a threshold positional state.

22. The method of claim 21, wherein the threshold positional state is a distance relative to the user in the interactive space.

* * * * *